(12) United States Patent
Boyer et al.

(10) Patent No.: US 6,311,259 B1
(45) Date of Patent: Oct. 30, 2001

(54) SYSTEM AND METHOD FOR READING UNIDIRECTIONALLY RECORDED DATA BIDIRECTIONALLY

(75) Inventors: Keith G. Boyer, Northglenn; Richard A. Gill, Arvada; Thomas H. Gohl, Westminster, all of CO (US)

(73) Assignee: Storage Technology Corporation, Louisville, CO (US)

( * ) Notice: Subject to any disclaimer, the term of this patent is extended or adjusted under 35 U.S.C. 154(b) by 1214 days.

(21) Appl. No.: 08/777,054

(22) Filed: Dec. 30, 1996

Related U.S. Application Data

(63) Continuation of application No. 08/322,511, filed on Oct. 14, 1994, now abandoned.

(51) Int. Cl.[7] ............................... G06F 9/26; G06F 9/34; G06F 13/12
(52) U.S. Cl. .......................... 711/201; 711/100; 711/152; 711/154; 711/211; 710/52; 710/65
(58) Field of Search .................................... 711/201, 211, 711/152, 100, 154; 710/52, 65

(56) References Cited

U.S. PATENT DOCUMENTS

| | | | |
|---|---|---|---|
| 3,579,195 | * | 5/1971 | Hallmark et al. . |
| 3,766,529 | * | 10/1973 | Mc Laughlin . |
| 5,050,018 | * | 9/1991 | Georgis et al. . |
| 5,287,478 | * | 2/1994 | Johnston et al. . |
| 5,349,481 | * | 9/1994 | Kauffman et al. . |

* cited by examiner

Primary Examiner—Krisna Lim
(74) Attorney, Agent, or Firm—Brooks & Kushman P.C.

(57) ABSTRACT

A system and method for allowing uni-directional data to be read in the reverse direction as well as the forward direction uses a data buffer to reverse the order of data read from storage media. Data are read from the storage media in the reverse direction and stored in a data buffer. Pointers are set up to track record boundaries of the data stored in the data buffer. The data are read from the data buffer in the opposite direction from which they are stored and sent to a host in the forward direction. Cyclic redundancy checks can be performed as data are read from the storage media in the reverse direction and read from the data buffer in the forward direction.

17 Claims, 2 Drawing Sheets

missing text placeholder …

SYSTEM AND METHOD FOR READING UNIDIRECTIONALLY RECORDED DATA BIDIRECTIONALLY

This is a continuation of application Ser. No. 08/322,511 filed on Oct. 14, 1994, now abandoned.

BACKGROUND OF THE INVENTION

1. Field of the Invention

The present invention relates generally to magnetic storage media, and more specifically to a system and method for allowing unidirectional data to be read in either direction.

2. Related Art

Data recorded onto media such as magnetic tapes are typically recorded using a data format standard. For example, one common format for recording 18-track magnetic tapes is the American National Standards Institute (ANSI) standard ASC X3. This standard, for parallel, group coded recording provides for re-blocking and data compression. The inherent nature of this format, however, makes it uni-directional. In other words, tapes written using this format can only be read in the forward direction, thus precluding the processor from reading a block of data in reverse.

To accommodate this standard, tapes recorded using this format are only read in the forward direction. The data read in the forward direction are sent to a buffer and then sent across a channel to the host site for processing. However, certain situations may arise in which it is necessary and/or beneficial to read the data from the tape in the reverse direction. In one such situation, errors may occur when trying to read a block of data in the forward direction. From a "data read" perspective, these errors may be avoided by reading the block in the reverse direction. However, if the data are read in the reverse direction, the host cannot process the data due to the unidirectional nature of the format.

In another situation, the host may request that the data blocks be sent in the reverse order. For example, a portion of the tape may consist of N blocks, in the order 1, 2, . . . , N. The host may request that the blocks be sent across the channel in the reverse order: N, N−1, N−2, . . . 1. To do this the tape must be positioned to the beginning of the last block, block N, and this block must be read in the forward direction. The tape must then be rewound to the beginning of the next-to-last block, block N−1, and this block read in the forward direction. This process of reading a block and rewinding the tape to the beginning of the previous block continues until all blocks of interest are read in the forward direction and sent to the host.

When the second situation arises, a significant amount of time is spent repositioning the tape to read each block in the forward direction. This problem is especially prevalent where tape drives having slow acceleration characteristics (such as streaming tape drives) are used.

SUMMARY OF THE INVENTION

The present invention provides a system and method for reading uni-directional data from a storage media in either the forward or reverse direction and presenting those data to a requesting host in the proper (e.g., forward) direction.

According to the invention, data read in the reverse direction are stored in a data buffer. Pointers or other marking techniques are used to indicate the boundaries of the data blocks in the data buffer. The data are then read out of the data buffer in the opposite direction from which they are stored and sent to the host via a channel. Preferably, the read is performed at the block level where each block is read in the opposite direction and sent to the host.

Data buffer control circuitry used to control the data buffer control data reads and writes and keeps track of pointers used to denote block boundaries. The control circuitry can be implemented to determine the level at which the reversal is to be performed. For example, if data are written to and read from the data buffer at the word level, the bytes that make up each word must be reversed as the data are read from the data buffer.

Because the data can be read from the buffer in the opposite direction from which it was stored, data can be read from the media in reverse, stored in the buffer, and sent to the host in the forward direction.

A CRC (cyclic redundancy check) is performed on the data as it is read from the media. This CRC is later used to verify the integrity of the data as they are read from the data buffer in the opposite direction. The CRC generation function uses a symmetric polynomial such that an expected result will exist in CRC generation after the data have been read from the buffer in the opposite direction.

If data compression techniques are used to store the data on the media, the data may need to be read in the forward direction to enable decompression. In a situation where the host is incapable of performing the data decompression, it is desirable to use the read reversal technique of the invention to provide the data in the forward direction out of the buffer and to decompress the data prior to transmission across the channel to the host.

Also, where blocking techniques are used to process host data records into blocks before writing the data to the media, the block, may, in itself be uni-directional. In other words, where there are multiple host data records in a single block, the data are usually unidirectional. In this situation, it is desirable to use the read reversal technique of the invention to provide the data in the forward direction out of the buffer for transmission across the channel to the host.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE EMBODIMENT

1. Overview of the Invention

The present invention is directed to a system and method for supporting a backward read of data recorded in a unidirectional format. According to the invention, data requested by a host can be read from the media in reverse, even if the host and/or the format can only support the data in the forward direction. If read in reverse, the data are buffered and then read out of the buffer in the opposite direction. As a result, the data can be sent to the host in the forward direction.

2. Example Environment

Figure 1:
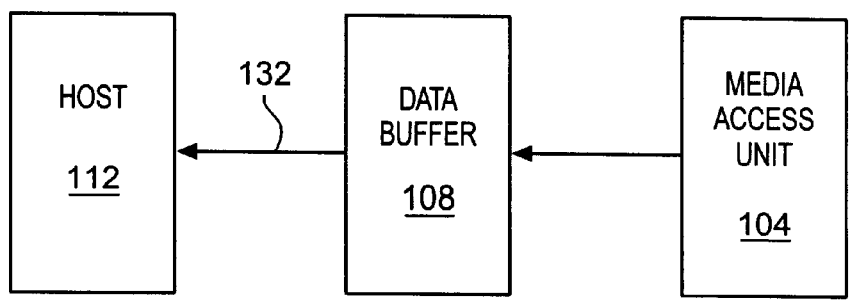
FIG. 1 is a block diagram illustrating an example environment of the present invention.

FIG. 1 is a block diagram illustrating an example environment of the invention. This environment includes a media access unit 104, a data buffer 108 and a host 112. Media access unit 104 is a unit for accessing data written to a storage media. Examples of media access unit 104 include an optical or magnetic tape drive, a disk drive, and other such storage devices. Data read by media access unit 104 are stored in data buffer 108 and sent across a channel 132 to host 112. Host 112 performs data processing, data analysis, or other data operations on the data read from the media.

As stated above, the invention is a system and method for reading data by media access unit 104 in the reverse direction and reversing this data in data buffer 108 so that it can be sent to host 112 in the forward direction. Although the invention is described herein in terms of this example environment, after reading the below description it will be apparent to a person skilled in the relevant art how to implement the invention in alternative environments.

3. Operation of the Invention

Figure 2:
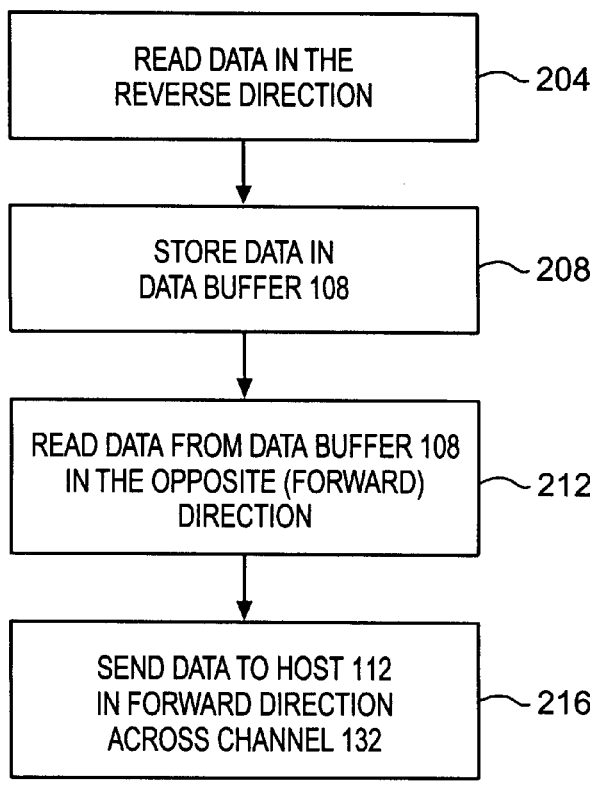
FIG. 2 is a high-level operational flow diagram illustrating the operation of the invention according to one embodiment.

FIG. 2 is a high-level operational flow diagram illustrating the operation of data read reversal in the example environment according to one embodiment of the invention. This operation is now described. In a step 204, data are read from the media in the reverse direction. In a step 208, the data are stored in data buffer 108. In a step 212, data are read from data buffer 108 in the opposite direction from which they were stored. As a result of this reversal performed in step 212, data read out of buffer 108 are in the forward direction. Finally, in a step 216, the data are sent to host 112 in the forward direction via channel 132.

Figure 3:
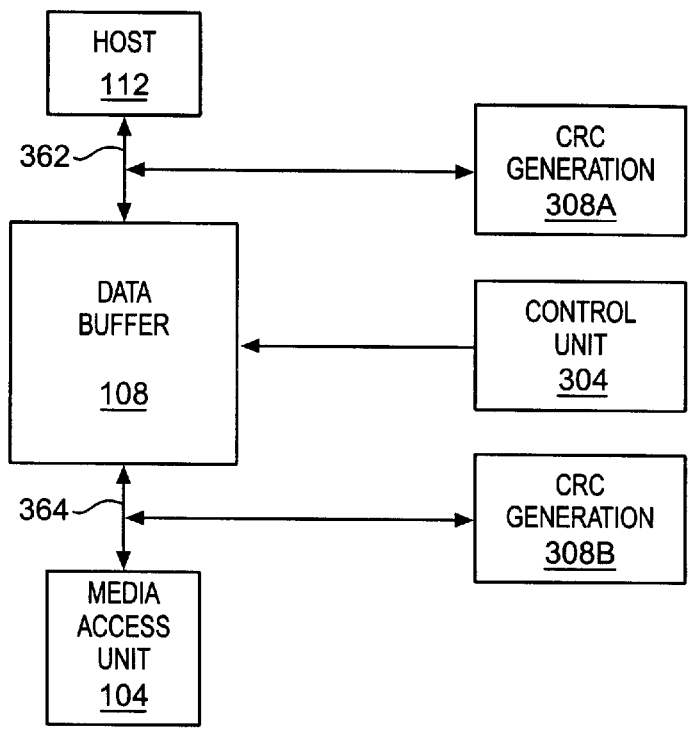
FIG. 3 is a block diagram illustrating a representative architecture of the invention.

This operation, having been generally described with reference to FIG. 2, is now described in greater detail. FIG. 3 is a block diagram illustrating a representative architecture for data buffer 108 and its control circuitry. A control unit 304 is provided to control access to data buffer 108. CRC (cyclic redundancy check) generation circuits 308A, 308B are provided to check the integrity of the data as they enter data buffer 108 (illustrated by flow line 364 and CRC generation circuit 308B) and as they are read out of data buffer 108 and sent to host 112 (illustrated by flow line 362 and CRC generation circuit 308A).

Figure 4:
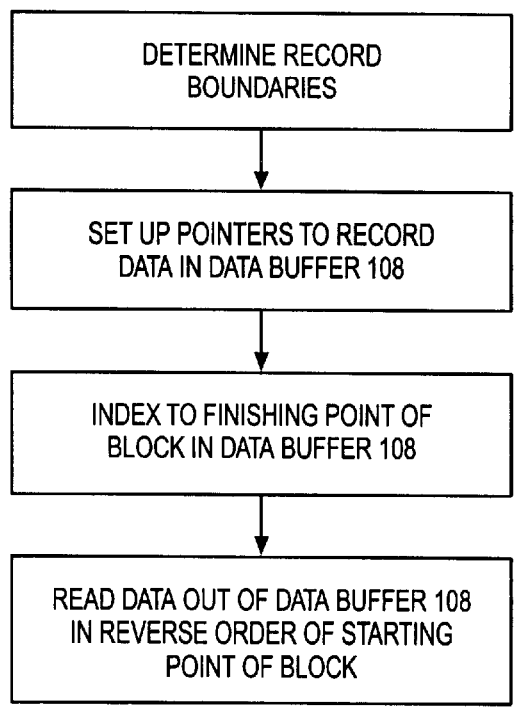
FIG. 4 is an operational flow diagram illustrating the read reversal operation according to one embodiment of the invention.

FIG. 4 is an operational flow diagram illustrating a manner by which data are recorded in and read out of data buffer 108 according to one embodiment. In a step 404, as data are stored in data buffer 108, the boundaries of each block are determined. In one embodiment, control unit 304 determines the starting point of the block being read (which is actually the end of the block in a forward-direction read) based on the data formatting, and stores the buffer address at which the data are stored. Similarly, control unit 304 determines the finishing point of the block being read (which is actually the beginning of the block in a forward-direction read).

In this document, the terms "starting point" and "finishing point" indicate the start and finish of a block of data as the block is stored in data buffer 108. The terms "beginning" and "end" refer to the beginning and end of a block of data in the forward direction.

In a step 408, pointers to the block are set up to indicate the location and boundaries of the block in data buffer 108. In one embodiment, the pointers indicate a start and finish address to indicate the starting point and finishing point, respectively, of the block. These pointers can be stored in a memory, preferably in control unit 308, for use when retrieving data from data buffer 108.

In an alternative embodiment, a start address indicates the starting point of the block and an index value is used to indicate the finish address. In yet another embodiment, one or more bits can be set in memory to indicate the boundaries of the block. One way to implement this embodiment is to extend the word length and use the extended portion as a place to hold a flag indicating that word is a boundary.

In a step 412, control unit 304 indexes to the finish address (finishing point) of the block (i.e., the beginning of the block in the forward direction) and, in a step 416, reads the data out of the data buffer 108 in the opposite direction until the starting point of the block is reached.

In one embodiment, the reading of data in the opposite direction is accomplished using the one's complement of an address generated by a standard counter.

In one embodiment, data are written to data buffer 108 in four-byte words. That is, each word is four bytes in length, and the data are written one word at a time. Because the data are read one word at a time, the order of the bytes within the word is in the forward order even though the read is in reverse. Thus, when the data are read from buffer 108 in the opposite direction, the order of the four bytes in each word is reversed. This can be accomplished using a 4:1 multiplexer.

To preserve data integrity, the invention can include CRC checking. It is desirable to verify the integrity of the data as they are being both written to and read from data buffer 108. However, because the data are read from data buffer 108 in the opposite from which they are written, conventional CRC checking does not apply. To accommodate this situation, the invention incorporates a symmetric CRC that functions the same in both directions. Thus regardless of whether the data are in the forward or reverse direction, the CRC check applies.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for retrieving uni-directional encrypted data, comprising the steps of:

reading the encrypted data from a storage media in an opposite direction from which it was written;

storing the encrypted data read from the media in a data buffer in the order in which the data was read; and decrypting the stored data from the data buffer in an opposite direction from which it was stored.

2. The method of claim 1, wherein said step of storing comprises the steps of:

determining boundaries of a data record read from the storage media;

establishing pointers to the data stored in the data buffer, wherein the pointers indicate the data record boundaries.

3. The method of claim 2, wherein the step of establishing pointers comprises the steps of:

storing a start address of the data record in a first memory location; and storing a finish address of the data record in a second memory location.

4. The method of claim 2, wherein said step of establishing pointers comprises the steps of:

storing a start address of the data record in a first memory location;

determining an index value indicating an end of the data record based on the start address; and storing the index value in a second memory location.

5. The method of claim 2, wherein the step of establishing pointers comprises the step of setting a flag bit in the data buffer at the starting point of each data record.

6. The method of claim 1, wherein the step of reading the data from the data buffer comprises the steps of:

indexing to a finishing point of a data record stored in the data buffer; and reading data out of the data buffer in reverse order from the finishing point to a starting point of the data record.

7. The method of claim 1, further comprising the step of sending the data read from the data buffer to a host in a forward direction.

8. The method of claim 7, further comprising the step of decompressing the data read from the data buffer prior to sending the data to the host.

9. A data storage and retrieval system for retrieving uni-directional encrypted data, comprising:

tape drive means for reading encrypted data from a storage media in an opposite direction from which it was written;

first buffer means for storing the encrypted data read from the media in the order in which the data was read; and second buffer means for decrypting the stored data in an opposite direction from which it was stored.

10. The system of claim 9, wherein the first buffer means comprises:

means for determining boundaries of a data record read from the storage media; and means for establishing pointers to the data stored in the data buffer, wherein the pointers indicate the data record boundaries.

11. The system of claim 10, wherein the means for establishing pointers comprises:

means for storing a start address of the data record in a first memory location; and means for storing a finish address of the data record in a second memory location.

12. The system of claim 10, wherein the means for establishing pointers comprises:

means for storing a start address of the data record in a first memory location;

means for determining an index value indicating an end of the data record based on the start address; and means for storing the index value in a second memory location.

13. The system of claim 10, wherein the means for establishing pointers comprises means for setting a flat bit in the data buffer at the starting point of each data record.

14. The system of claim 9, wherein the second means comprises:

means for indexing to a finishing point of a data record stored in the data buffer; and means for reading data out of the data buffer in reverse order from said finishing point to a starting point of the data record.

15. The system of claim 9, further comprising means for sending the data read from said data buffer to a host in a forward direction.

16. The system of claim 15, further comprising means for decompressing the data read from the data buffer prior to sending the data to said host.

17. The system of claim 9, wherein the first and second buffer means each comprise means for checking data integrity as data are stored in one direction and then read in the opposite direction.

* * * * *